United States Patent
Chuang et al.

(10) Patent No.: US 11,375,182 B2
(45) Date of Patent: Jun. 28, 2022

(54) METHOD AND APPARATUS OF CONSTRAINED LAYER-WISE VIDEO CODING

(71) Applicant: MEDIATEK INC., Hsinchu (TW)

(72) Inventors: Tzu-Der Chuang, Hsinchu (TW); Chih-Wei Hsu, Hsinchu (TW); Ching-Yeh Chen, Hsinchu (TW); Lulin Chen, San Jose, CA (US)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/121,927

(22) Filed: Dec. 15, 2020

(65) Prior Publication Data

US 2021/0185306 A1    Jun. 17, 2021

Related U.S. Application Data

(60) Provisional application No. 62/954,019, filed on Dec. 27, 2019, provisional application No. 62/948,971, filed on Dec. 17, 2019.

(51) Int. Cl.
| | | |
|---|---|---|
| H04N 19/105 | (2014.01) | |
| H04N 19/159 | (2014.01) | |
| H04N 19/573 | (2014.01) | |
| H04N 19/187 | (2014.01) | |
| H04N 19/186 | (2014.01) | |

(52) U.S. Cl.
CPC ......... *H04N 19/105* (2014.11); *H04N 19/159* (2014.11); *H04N 19/186* (2014.11); *H04N 19/187* (2014.11); *H04N 19/573* (2014.11)

(58) Field of Classification Search
CPC .. H04N 19/105; H04N 19/159; H04N 19/187; H04N 19/186; H04N 19/30; H04N 19/70
USPC ....................................................... 375/240.12
See application file for complete search history.

(56) References Cited

U.S. PATENT DOCUMENTS

| | | |
|---|---|---|
| 2013/0034170 A1 | 2/2013 | Chen et al. |
| 2014/0086333 A1 | 3/2014 | Wang |
| 2016/0241869 A1* | 8/2016 | Choi ...................... H04N 19/30 |
| 2018/0278963 A1 | 9/2018 | Schueuer et al. |

(Continued)

OTHER PUBLICATIONS

International Search Report and Written Opinion dated Mar. 17, 2021, issued in application No. PCT/CN2020/137176.

(Continued)

*Primary Examiner* — Marnie A Matt
(74) *Attorney, Agent, or Firm* — McClure, Qualey & Rodack, LLP

(57) ABSTRACT

Method and apparatus of video coding using a multi-layer prediction mode, are disclosed. According to one method, a bitstream is generated at an encoder side or received at a decoder side, where the bitstream corresponds to coded data of current video data in a current layer. The bitstream complies with a bitstream conformance requirement corresponding both the bit depth values for the current layer and the reference layer being the same and the chroma format index values for the current layer and the reference layer being the same. The current video data in the current layer is then encoded or decoded by utilizing reference video data in the reference layer.

3 Claims, 3 Drawing Sheets

(56) References Cited

U.S. PATENT DOCUMENTS

2019/0373290 A1   12/2019  Schueuer et al.
2020/0260070 A1*  8/2020  Yoo .................... H04N 19/103

OTHER PUBLICATIONS

Bross, B., et al.; "Versatile Video Coding (Draft 7);" Joint Video Experts Team (JVET) of ITU-T SG 16 WP 3 and ISO/IEC JTC 1/SC 29/WG 11; Oct. 2019; pp. 1-.

* cited by examiner

METHOD AND APPARATUS OF CONSTRAINED LAYER-WISE VIDEO CODING

CROSS REFERENCE TO RELATED APPLICATIONS

The present invention claims priority to U.S. Provisional Patent Application, Ser. No. 62/948,971, filed on Dec. 17, 2019 and U.S. Provisional Patent Application, Ser. No. 62/954,019, filed on Dec. 27, 2019. The U.S. Provisional Patent Applications are hereby incorporated by reference in their entireties.

FIELD OF THE INVENTION

The present invention relates to Layer-Wise Video Coding. In particular, the present invention relates to constraining parameters for layer-wise video coding to ensure proper motion compensation process for color video.

BACKGROUND AND RELATED ART

In VVC Draft 7 (B. Bross, et al., "Versatile Video Coding (Draft 7)", Joint Video Experts Team (WET) of ITU-T SG 16 WP 3 and ISO/IEC JTC 1/SC 29/WG 11, 16th Meeting: Geneva, CH, 1-11 Oct. 2019, Document: JVET-P2001), the layer-wise coding is supported. The layer structure is defined in video parameter set (VPS) as shown in Table 1.

The vps_max_layers_minus1 specifies the number of video layers in this VPS structure. The syntaxes, vps_all_independent_layers_flag, vps_independent_layer_flag[i], and vps_direct_ref_layer_flag[i][j] specify the inter-layer data reference dependency.

TABLE 1

| Video Parameter Set (VPS) in VVC to support the layer structure | Descriptor |
|---|---|
| video_parameter_set_rbsp( ) { | |
|     vps_video_parameter_set_id | u(4) |
|     vps_max_layers_minus1 | u(6) |
|     vps_max_sublayers_minus1 | u(3) |
|     if( vps_max_layers_minus1 > 0 && vps_max_sublayers_minus1 > 0 ) | |
|         vps_all_layers_same_num_sublayers_flag | u(1) |
|     if( vps_max_layers_minus1 > 0 ) | |
|         vps_all_independent_layers_flag | u(1) |
|     for( i = 0; i <= vps_max_layers_minus1; i++ ) { | |
|         vps_layer_id[ i ] | u(6) |
|         if( i > 0 && !vps_all_independent_layers_flag ) { | |
|             vps_independent_layer_flag[ i ] | u(1) |
|             if( !vps_independent_layer_flag[ i ] ) | |
|                 for( j = 0; j < i; j++ ) | |
|                       vps_direct_ref_layer_flag[ i ][ j ] | u(1) |
|         } | |
|     } | |
|     if( vps_max_layers_minus1 > 0 ) { | |
|         if( vps_all_independent_layers_flag ) | |
|             each_layer_is_an_ols_flag | u(1) |
|         if( !each_layer_is_an_ols_flag ) { | |
|             if( !vps_all_independent_layers_flag ) | |
|                 ols_mode_idc | u(2) |
|             if( ols_mode_idc = = 2 ) { | |
|                 num_output_layer_sets_minus1 | u(8) |
|                 for( i = 1; i <= num_output_layer_sets_minus1; i ++) | |
|                     for( j = 0; j <= vps_max_layers_minus1; j++ ) | |
|                         ols_output_layer_flag[ i ][ j ] | u(1) |
|             } | |
|         } | |
|     } | |
|     vps_num_ptls | u(8) |
|     for( i = 0; i < vps_num_ptls; i++ ) { | |
|         if ( i > 0 ) | |
|             pt_present_flag[ i ] | u(1) |
|         if( vps_max_sublayers_minus1 > 0 && !vps_all_layers_same_num_sublayers_flag ) | |
|             ptl_max_temporal_id[ i ] | u(3) |
|     } | |
|     while( !byte_aligned( ) ) | |
|         vps_ptl_byte_alignment_zero_bit /* equal to 0 */ | u(1) |
|     for( i = 0; i < vps_num_ptls; i++ ) | |
|         profile_tier_level( pt_present_flag[ i ], ptl_max_temporal_id[ i ] ) | |
|     for( i = 0; i < TotalNumOlss; i++ ) | |
|         if( NumLayersInOls[ i ] > 1 && vps_num_ptls > 1 ) | |
|             ols_ptl_idx[ i ] | u(8) |
|     if( !vps_all_independent_layers_flag ) | |
|         vps_num_dpb_params | ue(v) |
|     if( vps_num_dpb_params > 0 ) { | |
|         same_dpb_size_output_or_nonoutput_flag | u(1) |
|         if( vps_max_sublayers_minus1 > 0 ) | |
|             vps_sublayer_dpb_params_present_flag | u(1) |
|     } | |
|     for( i = 0; i < vps_num_dpb_params; i++ ) { | |
|         dpb_size_only_flag[ i ] | u(1) |

TABLE 1-continued

Video Parameter Set (VPS) in VVC to support the layer structure

|  | Descriptor |
|---|---|
|     if( vps_max_sublayers_minus1 > 0 && !vps_all_layers_same_num_sublayers_flag ) | |
|         dpb_max_temporal_id[ i ] | u(3) |
|     dpb_parameters( dpb_size_only_flag[ i ], dpb_max_temporal_id[ i ], | |
|         vps_sublayer_dpb_params_present_flag ) | |
| } | |
| for( i = 0; i < vps_max_layers_minus1 && vps_num_dpb_params > 1; i++ ) { | |
|     if( !vps_independent_layer_flag[ i ] ) | |
|         layer_output_dpb_params_idx[ i ] | ue(v) |
|     if( LayerUsedAsRefLayerFlag[ i ] && !same_dpb_size_output_or_nonoutput_flag ) | |
|         layer_nonoutput_dpb_params_idx[ i ] | ue(v) |
| } | |
| vps_general_hrd_params_present_flag | u(1) |
| if( vps_general_hrd_params_present_flag ) { | |
|     general_hrd_parameters( ) | |
|     if( vps_max_sublayers_minus1 > 0 ) | |
|         vps_sublayer_cpb_params_present_flag | u(1) |
|     if( TotalNumOlss > 1 ) | |
|         num_ols_hrd_params_minus1 | ue(v) |
|     for( i = 0; i <= num_ols_hrd_params_minus1; i++ ) { | |
|         if( vps_max_sublayers_minus1 > 0 && !vps_all_layers_same_num_sublayers_flag ) | |
|             hrd_max_tid[ i ] | u(3) |
|         firstSubLayer = vps_sublayer_cpb_params_present_flag ? 0 : hrd_max_tid[ i ] | |
|         ols_hrd_parameters( firstSubLayer, hrd_max_temporal_id[ i ] ) | |
|     } | |
|     if( num_ols_hrd_params_minus1 > 0 ) | |
|         for( i = 1; i < TotalNumOlss; i++ ) | |
|             ols_hrd_idx[ i ] | ue(v) |
| } | |
| vps_extension_flag | u(1) |
| if( vps_extension_flag ) | |
|     while( more_rbsp_data( ) ) | |
|         vps_extension_data_flag | u(1) |
| rbsp_trailing_bits( ) | |
| } | |

In each layer, one or more sequence parameter sets (SPS) are signalled. The SPS contains lots of video information, such as maximum picture width/height, chroma format, CTU size, etc. The inter-layer prediction can be supported in VVC. Between two different layers, the lower layer reconstructed pictures can be used as the reference pictures of the higher layer. If the picture sizes are different, the reference picture resampling is used to generate the prediction blocks. Therefore, two layers with different picture sizes are not the problem for layer-wise referencing in VVC. However, if the chroma formats of two layers are different, it might have problems for inter-layer prediction. For example, if the lower layer is a monochrome coded layer and the higher layer is in 420 chroma format, the chroma component predictor cannot be generated by using the inter-layer prediction.

BRIEF SUMMARY OF THE INVENTION

Method and apparatus of video coding using a multi-layer prediction mode, are disclosed. According to one method, a bitstream is generated at an encoder side or received at a decoder side, where the bitstream corresponds to coded data of current video data in a current layer. The bitstream complies with a bitstream conformance requirement corresponding to both the bit depth values for the current layer and the reference layer being the same and the chroma format index values for the current layer and the reference layer being the same. The current video data in the current layer is then encoded or decoded by utilizing reference video data in the reference layer.

In one embodiment, the bit depth values for the current layer and the reference layer are derived from bit_depth_minus8 syntax elements in the bitstream, where the bit_depth_minus8 syntax elements correspond to the bit depth values minus 8 for the current layer and the reference layer respectively.

In one embodiment, the chroma format index values for the current layer and the reference layer are determined according to chroma_format_idc syntax elements in the bitstream, where the chroma_format_idc syntax elements specify chroma sampling relative to luma sampling for the current layer and the reference layer respectively.

According to another method, a bitstream is generated at an encoder side or received at a decoder side, where the bitstream corresponds to coded data of current video data in a current layer. The bitstream complies with a bitstream conformance requirement comprising a first condition, a second condition, or both the first condition and the second condition. The first condition corresponds to that first bit-depth for the current layer is greater than or equal to second bit-depth for a reference layer. The second condition corresponds to that first chroma format index for the current layer is greater than or equal to second chroma format index for the reference layer, and the first chroma format index and the second chroma format index specify chroma sampling relative to luma sampling for the current layer and the reference layer respectively. A larger chroma format index value indicates a higher sampling density. The current video data in the current layer is then encoded or decoded by utilizing reference video data in the reference layer along with the first bit-depth and the second bit-depth, the first chroma format index and the second chroma format index, or both the first bit-depth and the second bit-depth and the first chroma format index and the second chroma format index.

According to yet another method, input data are received, where the input data correspond to video data in a current layer at a video encoder side or the input data correspond to coded video data in the current layer at a video decoder side. Motion compensation is applied to the video data in the current layer at the encoder side or to the coded video data in the current layer at the video decoder side by utilizing reference video data in a reference layer. The motion compensation utilizes information comprising chroma formats or one or more variables related to the chroma format for both the current layer and the reference layer, bit-depth values for both the current layer and the reference layer, or both the chroma formats or said one or more variables related to the chroma format for both the current layer and the reference layer and the bit-depth values for both the current layer and the reference layer.

In one embodiment, the chroma formats or said one or more variables comprise a first variable corresponding to horizontal chroma sub-sampling factor, a second variable corresponding to vertical chroma sub-sampling factor, or both the first variable and the second variable.

In another embodiment, the bit-depth values are derived from syntax elements signaled in a bitstream or parsed from the bitstream, where syntax elements correspond to the bit-depth values minus 8 for the current layer and the reference layer respectively.

In another embodiment, the reference sample position of the reference layer is calculated in the motion compensation process by utilizing the horizontal chroma sub-sampling factor, the vertical chroma sub-sampling factor, or both.

In another embodiment, the reference sample position of the reference layer is calculated in the motion compensation process by utilizing the ratio of the horizontal chroma sub-sampling factor of current layer to the horizontal chroma sub-sampling factor of reference layer, the ratio of the vertical chroma sub-sampling factor of current layer to the vertical chroma sub-sampling factor of reference layer, or both.

DETAILED DESCRIPTION OF THE INVENTION

Figure 1:
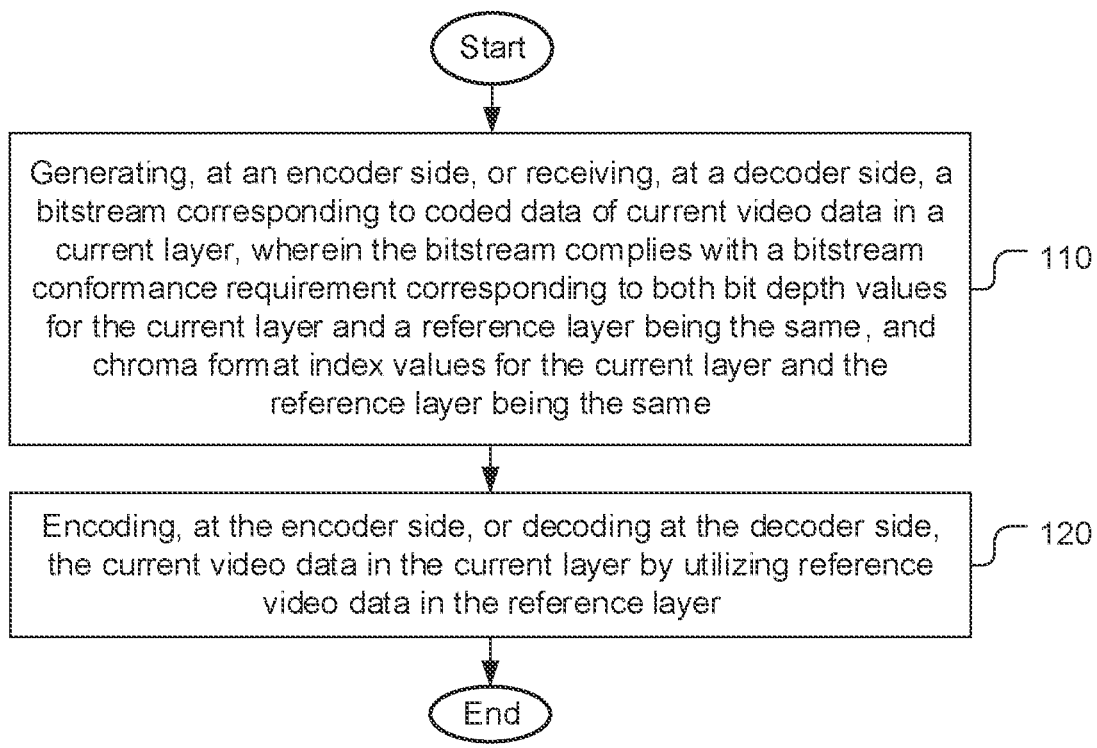
FIG. 1 illustrates an exemplary block diagram of a system incorporating constrained layer-wise video coding according to an embodiment of the present invention, where both the bit depth values and the chroma format index values for the current layer and the reference layer are the same.

The following description is of the best-contemplated mode of carrying out the invention. This description is made for the purpose of illustrating the general principles of the invention and should not be taken in a limiting sense. The scope of the invention is best determined by reference to the appended claims.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In the description like reference numbers appearing in the drawings and description designate corresponding or like elements among the different views.

Method-1: Constraint of the Chroma Format

In this invention, the chroma format of different layers shall be constrained. In one embodiment, the chroma format of two or more layers that have dependency (e.g. one being referenced by another) shall be the same. The chroma format of the higher layer shall be the same as that of the lower reference layers. For example, it is a requirement of bitstream conformance that the value of chroma_format_idc of the current layer shall be the same as the value of chroma_format_idc of the reference layers. As is known in the VVC draft standard, chroma format index specifies chroma sampling relative to luma sampling. chroma_format_idc with a value of 0, 1, 2 and 3 corresponds to chroma format of monochrome, 4:2:0, 4;2:2, and 4:4;4 respectively. The 4:2:0 (also, referred as 420) format corresponds to horizontal and vertical 2:1 sub-sampling. The 4:2:2 (also, referred as 422) format corresponds to horizontal 2:1 sub-sampling. The 4:4:4 (also, referred as 444) format corresponds no sub-sampling in the horizontal or vertical direction. Therefore, a larger chroma format index value indicates a higher sub-sampling density. In another example, it is a requirement of bitstream conformance that the value of chroma_format_idc of the current picture shall be the same as the value of chroma_format_idc of the reference pictures. In another embodiment, the values of bit-depth related syntax elements (e.g. bit_depth_minus8, bit_depth_luma_minus8, and/or bit_depth_chroma_minus8) of the current layer are also constrained. For example, it is a requirement of bitstream conformance that the value of bit-depth related syntax elements (e.g. bit_depth_minus8, bit_depth_luma_minus8, and/or bit_depth_chroma_minus8) of the current layer shall be the same as that of the reference layers.

In another embodiment, the values of separate color plane flag (e.g. separate_color_plane_flag) of the current layer are also constrained. For example, it is a requirement of bitstream conformance that the value of separate color plane flag (e.g. separate_color_plane_flag) of the current layer shall be the same as that of the reference layers. In another embodiment, the values of chroma phase flags (e.g. sps_chroma_horizontal_collocated_flag and sps_chroma_vertical_collocated_flag) of the current layer are also constrained. For example, it is a requirement of bitstream conformance that the value of chroma phase flags (e.g. sps_chroma_horizontal_collocated_flag and sps_chroma_vertical_collocated_flag) of the current layer shall be the same as that of the reference layers.

In another embodiment, the value of chroma format index (e.g. chroma_format_idc) of the higher layer shall be greater than or equal to the lower layer (e.g. the reference layer). For example, it is a requirement of bitstream conformance that the value of chroma_format_idc of the current layer shall be greater than or equal to the value of chroma_format_idc of the reference layers. In another example, it is a requirement of bitstream conformance that the value of chroma_format_idc of the current picture shall be greater than or equal to the value of chroma_format_idc of the reference pictures. Since the chroma_format_idc value of the current layer/picture is greater than that of the reference layer/picture, the number of chroma samples of the reference layer/picture is less than that of the current layer/picture, the chroma motion compensation will need to perform the interpolation in the subsampled domain. For example, if the chroma format of the current layer/picture is 4:4:4 and the chroma format of the reference layer/picture is 4:2:0, the chroma picture size of the reference layer/picture is treated as a half size of the current picture in width and height.

In one embodiment, the scaling ratios of luma sample and chroma sample are derived separately. The scaling window offsets (e.g. scaling_win_left_offset and scaling_win_top_offset) of luma sample and chroma sample are also derived separately. If the reference layer has less color component (e.g. monochroma), a predefined, derived, or signaled value is assigned to the predictors of missing color components. For example, the value of (1<<(bit_depth−1)) can be used as the predictors of the missing color components.

In another embodiment, the value of chroma format index (e.g. chroma_format_idc) of the higher layer shall be less than or equal to the lower layer (e.g. the reference layer). For example, it is a requirement of bitstream conformance that the value of chroma_format_idc of the current layer shall be less than or equal to the value of chroma_format_idc of the reference layers. In another example, it is a requirement of bitstream conformance that the value of chroma_format_idc of the current picture shall be less than or equal to the value of chroma_format_idc of the reference pictures. Since the chroma_format_idc value of the current layer/picture is less than that of the reference layer/picture, the number of chroma samples of the reference layer/picture is less than that of the current layer/picture. Therefore, the chroma motion compensation will need to perform the interpolation in the upsampled domain. For example, if the chroma format of the current layer/picture is 4:2:0 and the chroma format of the reference layer/picture is 4:4:4, the chroma picture size of the reference layer/picture is treated as a double size of the current picture in width and height.

In one embodiment, the scaling ratios of luma sample and chroma sample are derived separately. The scaling window offsets (e.g. scaling_win_left_offset and scaling_win_top_offset) of luma sample and chroma sample are also derived separately. In another embodiment, when the reference layer/picture has a greater value of chroma_format_idc than that of the current layer/picture, a chroma sample subsampling process is applied in advance or on-the-fly on the reference layer/picture to match with the chroma format of the current layer/picture.

Method-2: Inferred Value of chroma_format_idc for Higher Layer

In this invention, one or more inter-layer reference/prediction syntax elements are signalled in the SPS or the PPS, such as the inter_layer_ref_pics_present_flag. If the syntax element indicates that the inter-layer referencing/prediction is used, one or more syntax elements are skipped and the values of the syntax elements are inferred. For example, the value of chroma_format_idc is inferred as the same value of chroma_format_idc of the reference layer. In another example, the values of bit-depth related syntax elements (e.g. bit_depth_minus8, bit_depth_luma_minus8, and/or bit_depth_chroma_minus8) of the current layer are also inferred as the same values of those of the reference layer if the inter-layer reference/prediction is used. In another example, the value of separate color plane flag (e.g. separate_color_plane_flag) of the current layer is also inferred as the same value of the reference layer if the inter-layer referencing/prediction is used. In another example, the values of chroma phase flags (e.g. sps_chroma_horizontal_collocated_flag and sps_chroma_vertical_collocated_flag) of the current layer are also inferred as the same values of the reference layer if the inter-layer referencing/prediction is used.

The syntax elements of chroma_format_idc, bit_depth_minus8, bit_depth_luma_minus8, bit_depth_chroma_minus8, separate_colour_plane_flag, sps_chroma_horizontal_collocated_flag, and sps_chroma_vertical_collocated_flag are moved to the place after the inter-layer referencing/prediction syntax elements accordingly in the SPS or the PPS wherever is relevant.

Method-3: Considering Chroma Format in Motion Compensation

In this invention, the chroma formats of the current layer/picture and the reference layer/picture are taken into consideration in the motion compensation process. When doing motion compensation, considering the chroma format or the variable related to the chroma format (e.g. SubWidthC and RefSubWidthC) of the current layer and the reference layer. The SubWidthC and SubHeightC values derived from chroma_format_idc and separate_colour_plane_flag are shown in Table 2. For example, when doing the motion compensation, a reference sample position of the reference layer is calculated in the motion compensation process by utilizing the SubWidthC, the SubHeightC, or both. In another example, when doing the motion compensation, a reference sample position of the reference layer is calculated in the motion compensation process by utilizing the ratio of the SubWidthC of current layer to the SubWidthC of reference layer, the ratio of the SubHeightC of current layer to the SubHeightC of reference layer, or both.

TABLE 2

SubWidthC and SubHeightC values derived from
chroma_format_idc and separate_colour_plane_flag

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In the following, we illustrate part of the decoding process of chroma motion compensation in VVC. The scalingRatio[0] and scalingRatio[1] are the horizontal and vertical scaling ratio derived from the luma scaling window. The SubWidthC and SubHeightC are the chroma subsample ratio (related to luma samples) in horizontal and vertical direction as shown in Table 2. The refMvCLX is the chroma MV.

```
addX = sps_chroma_horizontal_collocated_flag ?
    0 : 8 * ( scalingRatio[ 0 ] − ( 1 << 14 ) )
addY = sps_chroma_vertical_collocated_flag ?
    0 : 8 * ( scalingRatio[ 1 ] − ( 1 << 14 ) )
refxSb_C = ( ( ( xSb − scaling_win_left_offset ) /
    SubWidthC << 5 ) + refMvCLX[ 0 ] ) *
        scalingRatio[ 0 ] + addX
refx_C = ( ( Sign( refxSb_C ) * ( ( Abs( refxSb_C ) + 256 ) >> 9 )
    + xC * ( ( scalingRatio[ 0 ] + 8 ) >> 4 ) ) +
    fRefLeftOffset / SubWidthC + 16 ) >> 5
refySb_C = ( ( ( ySb − scaling_win_top_offset ) /
    SubHeightC << 5 ) +
        refMvCLX[ 1 ] ) *scalingRatio[ 1 ] + addY
refy_C = ( ( Sign( refySb_C ) * ( ( Abs( refySb_C ) + 256 ) >>
    9 ) + yC* ( ( scalingRatio[ 1 ] + 8 )
        >> 4 ) ) + fRefTopOffset / SubHeightC + 16 ) >> 5
```

In the above equations, (refxSbC, refySbC) and (refxC, refyC) are chroma locations pointed to by a motion vector (refMvLX[0], refMvLX[1]) given in 1/32-sample units. To support the motion compensation with different chroma formats, the RefSubWidthC and RefSubHeightC are derived to be equal to the SubWidthC and SubHeightC of the reference layer/picture, respectively. The motion compensation process is modified as follow:

```
addX = sps_chroma_horizontal_collocated_flag ?
    0 : 8 * ( scalingRatio[ 0 ] − ( 1 << 14 ) )
addY = sps_chroma_vertical_collocated_flag ?
    0 : 8 * ( scalingRatio[ 1 ] − ( 1 << 14 ) )
refxSb_C = ( ( ( xSb − scaling_win_left_offset ) /
    SubWidthC << 5 ) + refMvCLX[ 0 ] ) *
        scalingRatio[ 0 ] + addX                    (947)
refx_C = ( ( Sign( refxSb_C ) * ( ( Abs( refxSb_C ) +
    256 ) >> 9 )+ xC * ( ( scalingRatio[ 0 ] + 8 )
        >> 4 ) )* (SubWidthC/RefSubWidthC) + fRefLeftOffset /
        RefSubWidthC + 16 ) >> 5
refySb_C = ( ( ( ySb − scaling_win_top_offset) /
    SubHeightC << 5 ) + refMvCLX[ 1 ] ) *
        scalingRatio[ 1 ] + addY
refy_C = ( ( Sign( refySb_C ) * ( ( Abs( refySb_C ) +
    256 ) >> 9 )+ yC* ( ( scalingRatio[ 1 ] + 8 )
        >> 4 ) )* (SubHeightC/RefSubHeightC) + fRefTopOffset /
        RefSubHeightC + 16 ) >> 5
```

In another embodiment, the chroma phase of reference layer/picture is also considered. Let the RefChromaHorCollocatedFlag and RefChromaVerCollocatedFlag be the sps_chroma_horizontal_collocated_flag and sps_chroma_vertical_collocated_flag of the reference layer/picture.

```
addXcur = (sps_chroma_horizontal_collocated_flag ?
    0 : 16) * scalingRatio[ 0 ] / SubWidthC
addXref = (RefChromaHorCollocatedFlag ? 0 : 16) * (
    1 << 14 ) / RefSubWidthC
addX = addXcur − addXref
addYcur = (sps_chroma_vertical_collocated_flag ?
    0 : 16) * scalingRatio[ 1 ] / SubHeightC
addYref = (RefChromaVerCollocatedFlag ? 0 : 16) * (
    1 << 14 ) / RefSubHeightC
addY = addYcur − addYref
refxSb_C = ( ( ( xSb − scaling_win_left_offset ) /
    SubWidthC << 5 ) + refMvCLX[ 0 ] ) *
        scalingRatio[ 0 ] + addX
refx_C = ( ( Sign( refxSb_C ) * ( ( Abs( refxSb_C ) +
    256 ) >> 9 )+ xC * ( ( scalingRatio[ 0 ] + 8 )
        >> 4 ) ) * (SubWidthC/RefSubWidthC) + fRefLeftOffset /
        RefSubWidthC + 16 ) >> 5
refySb_C = ( ( ( ySb − scaling_win_top_offset ) /
    SubHeightC << 5 ) + refMvCLX[ 1 ] ) *
        scalingRatio[ 1 ] + addY
refy_C = ( ( Sign( refySb_C ) * ( ( Abs( refySb_C ) +
    256 ) >> 9 )+ yC* ( ( scalingRatio[ 1 ] + 8 )
        >> 4 ) )* (SubHeightC/RefSubHeightC) + fRefTopOffset /
        RefSubHeightC + 16 ) >> 5
```

In another embodiment, the luma MV, refMvLX[ ] is used. The (refxSbc, refySbc) and (refxc, refyc) are derived by using the corresponding luma sample position and then converting it to the chroma sample position in the reference layer/picture.

In this invention, if the reference layer has less color components (e.g. monochroma), a predefined, derived, or signaled value is assigned to the predictors of missing color components. For example, the value of (1<<(bit_depth−1)) can be used as the predictors of the missing color components.

In another embodiment, if the bit-depth of two layers are different, the bit-depth truncation or bit-depth extension process is applied. If the lower layer has lower bit-depth, the bit-depth extension is applied. The zero bits are inserted after the LSB until the bit-depth of two layers are the same. If the lower layer has higher bit-depth, the bit-depth truncation is applied. The LSB is removed until the bit-depth of two layers are the same.

Method-4: Bit Depth Constraint for Multi-Layer Structure

In this method, to support the bit depth scalability for multi-layer structure, it is proposed to add a bitstream constraint that the bit depth of the higher layer shall be greater than or equal to the bit depth of the lower layer. For example, it is a requirement of bitstream conformance that the value of bit_depth_minus8 of the current layer shall be greater than or equal to the value of bit_depth_minus8 of the reference layers of the current layer.

In this method, it is proposed to consider the bit-depth of the current layer and the bit-depth of the reference layer when performing motion compensation.

Since the reference picture may have smaller bit depth than the current picture, the decoding process of the inter prediction need to be modified. In one embodiment, the left shift and right shift parameter in interpolation filtering process need to consider the bit depth of the reference picture and the current picture. For example, when directly fetching the integer pixel without performing interpolation, the left shift (shift3) needs to consider the bit depth difference between current picture and reference picture. The shift3 can be modified from Max(2, 14−BitDepth) to Max(2+BitDepth−RefBitDepth, 14−RefBitDepth). Also, for gradient calculation in prediction refinement with optical flow (PROF), the reference samples can be directly used. If the bit depth of current picture and reference picture are different, the shift value should be modified. For example, it can be modified from Max(2, 14−BitDepth) to Max(2+BitDepth−RefBitDepth, 14−RefBitDepth). When doing the interpolation, the input reference sample can be left shifted by a amount, e.g. shift4. The shift4 can be the bit depth difference between current picture and reference picture. The scaling window sizes is proposed as follows and highlighted in Italic. In the following, the section numbers (e.g., 8.5.6.3.2) are the section numbers in VVC Draft 7.

8.5.6.3.2 Luma Sample Interpolation Filtering Process

Output of this process is a predicted luma sample value predSampleLX$_L$

The variables shift1, shift2 and shift3 are derived as follows:

- Let the RefBitDepth be the BitDepth of the reference picture. The variable shift1 is set equal to Min( 4, BitDepth − 8 ), the variable shift2 is set equal to 6 , the variable shift3 is set equal to Max( 2 + BitDepth − RefBitDepth, 14 − RefBitDepth) and the veriable shift4 is set equal to (BitDepth − RefBitDepth).
- The variable picW is set equal to pic_width_in_luma_samples and the variable picH is set equal to pic_height_in_luma_samples.
...

The predicted luma sample value predSampleLX$_L$ is derived as follows:

- If both xFrac$_L$ and yFrac$_L$ are equal to 0, and both scalingRatio[ 0 ] and scalingRatio[ 1 ] are less than 20481, the value of predSampleLX$_L$ is derived as follows:
    predSampleLX$_L$ = refPicLX$_L$[ xInt$_3$ ][ yInt$_3$ ] << shift3
- Otherwise, if yFrac$_L$ is equal to 0 and scalingRatio[ 1 ] is less than 20481, the value of predSampleLX$_L$ is derived as follows:
    predSampleLX$_L$ = ( $\Sigma_{i=0}^{7}$ f$_{LH}$[ xFrac$_L$ ][ i ] (refPicLX$_L$[ xInt$_i$ ][ yInt$_3$ ] << shift4) ) >> shift1
- Otherwise, if xFrac$_L$ is equal to 0 and scalingRatio[ 0 ] is less than 20481, the value of predSampleLX$_L$ is derived as follows:
    predSampleLX$_L$ = ( $\Sigma_{i=0}^{7}$ f$_{LV}$[ yFrac$_L$ ][ i ] * (refPicLX$_L$[ xInt$_3$ ][ yInt$_i$ ] << shift4) ) >> shift1
- Otherwise, the value of predSampleLX$_L$ is derived as follows:
    - The sample array temp[ n ] with n = 0..7, is derived as follows:
        temp[ n ] = ( $\Sigma_{i=0}^{7}$ f$_{LH}$[ xFrac$_L$ ][ i ] * (refPicLX$_L$[ xInt$_i$ ][ yInt$_n$ ] << shift4) ) >> shift1
    - The predicted luma sample value predSampleLX$_L$ is derived as follows:
        predSampleLX$_L$ = ( $\Sigma_{i=0}^{7}$ f$_{LV}$[ yFrac$_L$ ][ i ] * temp[ i ] ) >> shift2

8.5.6.3.3 Luma Sample Interpolation Filtering Process

Inputs to this process are:

a luma location in full-sample units (xInt$_L$, yInt$_L$), the luma reference sample array refPicLX$_L$, Output of this process is a predicted luma sample value predSampleLX$_L$.

- Let the RefBitDepth be the BitDepth of the reference picture. The variable shift is set equal to Max( 2 + BitDepth − RefBitDepth, 14 − RefBitDepth).
- The variable picW is set equal to pic_width_in_luma_samples and the variable picH is set equal to pic_height_in_luma_samples.

8.5.6.3.4 Chroma Sample Interpolation Process

Output of this process is a predicted chroma sample value predSampleLX$_C$. The variables shift1, shift2 and shift3 are derived as follows:

- Let the RefBitDepth be the BitDepth of the reference picture. The variable shift1 is set equal to Min( 4, BitDepth − 8 ), the variable shift2 is set equal to 6 , the variable shift3 is set equal to Max( 2 + BitDepth − RefBitDepth, 14 − RefBitDepth) and the veriable shift4 is set equal to (BitDepth − RefBitDepth).
- The variable picW$_C$ is set equal to pic_width_in_luma_samples / SubWidthC and the variable picH$_C$ is set equal to pic_height_in_luma_samples / SubHeightC.
...

The predicted chroma sample value predSampleLX$_C$ is derived as follows:

- If both xFrac$_C$ and yFrac$_C$ are equal to 0, and both scalingRatio[ 0 ] and scalingRatio[ 1 ] are less than 20481, the value of predSampleLX$_C$ is derived as follows:
    predSampleLX$_C$ = refPicLX$_C$[ xInt$_1$ ][ yInt$_1$ ] << shift3
- Otherwise, if yFrac$_C$ is equal to 0 and scalingRatio[ 1 ] is less than 20481, the value of predSampleLX$_C$ is derived as follows:
    predSampleLX$_C$ = ( $\Sigma_{i=0}^{3}$ f$_{CH}$[ xFrac$_C$ ][ i ] * (refPicLX$_C$[ xInt$_i$ ][ yInt$_1$ ] << shift4)) >> shift1
- Otherwise, if xFrac$_C$ is equal to 0 and scalingRatio[ 0 ] is less than 20481, the value of predSampleLX$_C$ is derived as follows:
    predSampleLX$_C$ = ( $\Sigma_{i=0}^{3}$ f$_{CV}$[ yFrac$_C$ ][ i ] * (refPicLX$_C$[ xInt$_1$ ][ yInt$_i$ ]<< shift4) ) >> shift1
- Otherwise, the value of predSampleLX$_C$ is derived as follows:
    - The sample array temp[ n ] with n = 0..3, is derived as follows:
        temp[ n ] = ( $\Sigma_{i=0}^{3}$ f$_{CH}$[ xFrac$_C$ ][ i ] * (refPicLX$_C$[ xInt$_i$ ][ yInt$_n$ ] << shift4)) >> shift1
    - The predicted chroma sample value predSampleLX$_C$ is derived as follows:
        predSampleLX$_C$ =( f$_{CV}$[ yFrac$_C$ ][ 0 ] * temp[ 0 ] + f$_{CV}$[ yFrac$_C$ ][ 1 ] * temp[ 1 ]
        + f$_{CV}$[ yFrac$_C$ ][ 2 ] * temp[ 2 ] + f$_{CV}$[ yFrac$_C$ ][ 3 ] * temp[ 3 ] ) >> shift2

In another embodiment, the left shift and right shift parameter in interpolation filtering process need to consider the bit depth of the reference picture and the current picture. For example, when directly fetching the integer pixel without performing the interpolation, the left shift (shift3) needs to consider the bit depth difference between the current picture and the reference picture. The shift3 can be modified from Max(2, 14−BitDepth) to Max(2+BitDepth−RefBitDepth, 14−RefBitDepth). Also, for gradient calculation in prediction refinement with optical flow (PROF), the reference samples are directly used. If the bit depth of current picture and reference picture are different, the shift value should be modified. For example, it can be modified from Max(2, 14−BitDepth) to Max(2+BitDepth−RefBitDepth, 14−RefBitDepth). When performing the interpolation, the input reference sample can be left shifted by an amount, such as shift4. The shift4 can be the bit depth difference between the current picture and the reference picture. For the right-shift in first stage interpolation filter (e.g. shift1), it can consider the bit depth difference between the current picture and the reference picture. The shift1 and shift4 can be compensated by each other. Only one of them can be a non-zero positive integer. If one of them is a positive integer, the other is zero. Or, both shift1 and shift4 can be zero. The shift1 can be modified from Min(4, BitDepth−8) to Max(2+BitDepth−RefBitDepth, 14−RefBitDepth). The shift4 can be modified as Max(0,Max(BitDepth−RefBitDepth−4, 8−RefBitDepth)). An example of the proposed text for the scaling window sizes based on VVC Draft 7 is as follows and highlighted in Italic.

8.5.6.3.2 Luma Sample Interpolation Filtering Process

Output of this process is a predicted luma sample value predSampleLX$_L$. The variables shift1, shift2 and shift3 are derived as follows:

- Let the RefBitDepth be the BitDepth of the reference picture. The variable shift1 is set equal to Max(0,Min(RefBitDepth + 4 − BitDepth , RefBitDepth − 8)), the variable shift2 is set equal to 6 , the variable shift3 is set equal to Max( 2 + BitDepth − RefBitDepth, 14 − RefBitDepth) and the veriable shift4 is set equal to Max(0,Max(BitDepth − RefBitDepth − 4, 8 − RefBitDepth)).
- The variable picW is set equal to pic_width_in_luma_samples and the variable picH is set equal to pic_height_in_luma_samples.

The predicted luma sample value predSampleLX$_L$ is derived as follows:

- If both xFrac$_L$ and yFrac$_L$ are equal to 0, and both scalingRatio[ 0 ] and scalingRatio[ 1 ] are less than 20481, the value of predSampleLX$_L$ is derived as follows:
    predSampleLX$_L$ = refPicLX$_L$[ xInt$_3$ ][ yInt$_3$ ] << shift3
- Otherwise, if yFrac$_L$ is equal to 0 and scalingRatio[ 1 ] is less than 20481, the value of predSampleLX$_L$ is derived as follows:
    predSampleLX$_L$ = ( $\Sigma_{i=0}^{7}$ f$_{LH}$[ xFrac$_L$ ][ i ] *
    (refPicLX$_L$[ xInt$_i$ ][ yInt$_3$ ] << shift4)) >> shift1
- Otherwise, if xFrac$_L$ is equal to 0 and scalingRatio[ 0 ] is less than 20481, the value of predSampleLX$_L$ is derived as follows:
    predSampleLX$_L$ = ( $\Sigma_{i=0}^{7}$ f$_{LV}$[ yFrac$_L$ ][ i ] *
    (refPicLX$_L$[ xInt$_3$ ][ yInt$_i$ ] << shift4)) >> shift1
- Otherwise, the value of predSampleLX$_L$ is derived as follows:
    - The sample array temp[ n ] with n = 0..7, is derived as follows:
        temp[ n ] = ( $\Sigma_{i=0}^{7}$ f$_{LH}$[ xFrac$_L$ ][ i ] * (refPicLX$_L$[ xInt$_i$ ][ yInt$_n$ ] << shift4)) >> shift1
    - The predicted luma sample value predSampleLX$_L$ is derived as follows:
        predSampleLX$_L$ = ( $\Sigma_{i=0}^{7}$ f$_{LV}$[ yFrac$_L$ ][ i ] * temp[ i ] ) >> shift2

8.5.6.3.3 Luma Sample Interpolation Filtering Process

Inputs to this process are:

a luma location in full-sample units (xInt$_L$, yInt$_L$), the luma reference sample array refPicLX$_L$, Output of this process is a predicted luma sample value predSampleLX$_L$.

- Let the RefBitDepth be the BitDepth of the reference picture. The variable shift is set equal to Max( 2 + BitDepth − RefBitDepth, 14 − RefBitDepth). The variable picW is set equal to pic_width_in_luma_samples and the variable picH is set equal to pic_height_in_luma_samples.

8.5.6.3.4 Chroma Sample Interpolation Process

Output of this process is a predicted chroma sample value predSampleLX$_C$. The variables shift1, shift2 and shift3 are derived as follows:

- Let the RefBitDepth be the BitDepth of the reference picture. The variable shift1 is set equal to Max(0,Min(RefBitDepth + 4 − BitDepth, RefBitDepth − 8)), the variable shift2 is set equal to 6, the variable shifts is set equal to Max( 2 + BitDepth − RefBitDepth, 14 − RefBitDepth) and the veriable shift4 is set equal to Max(0,Max(BitDepth − RefBitDepth − 4, 8 − RefBitDepth)).
- The variable picW$_C$ is set equal to pic_width_in_luma_samples / SubWidthC and the variable picH$_C$ is set equal to pic_height_in_luma_samples / SubHeightC.

The predicted chroma sample value predSampleLX$_C$ is derived as follows:

- If both xFrac$_C$ and yFrac$_C$ are equal to 0, and both scalingRatio[ 0 ] and scalingRatio[ 1 ] are less than 20481, the value of predSampleLX$_C$ is derived as follows:
  predSampleLX$_C$ = refPicLX$_C$[ xInt$_1$ ][ yInt$_1$ ] << shift3
- Otherwise, if yFrac$_C$ is equal to 0 and scalingRatio[ 1 ] is less than 20481, the value of predSampleLX$_C$ is derived as follows:
  predSampleLX$_C$ = ( $\Sigma_{i=0}^{3}$ f$_{CH}$[ xFrac$_C$ ][ i ] * (refPicLX$_C$[ xInt$_i$ ][ yInt$_1$ ] << shift4)) >> shift1
- Otherwise, if xFrac$_C$ is equal to 0 and scalingRatio[ 0 ] is less than 20481, the value of predSampleLX$_C$ is derived as follows:
  predSampleLX$_C$ = ( $\Sigma_{i=0}^{3}$ f$_{Cv}$[ yFrac$_C$ ][ i ] * (refPicLX$_C$[ xInt$_1$ ][ yInt$_i$ ]<< shift4) ) >> shift1
- Otherwise, the value of predSampleLX$_C$ is derived as follows:
- The sample array temp[ n ] with n = 0..3, is derived as follows:
  temp[ n ] = ( $\Sigma_{i=0}^{3}$ f$_{CH}$[ xFrac$_C$ ][ i ] * (refPicLX$_C$[ xInt$_i$ ][ yInt$_n$ ] << shift4)) >> shift1
- The predicted chroma sample value predSampleLX$_C$ is derived as follows:
  predSampleLX$_C$ =( f$_{Cv}$[ yFrac$_C$ ][ 0 ] * temp[ 0 ] + f$_{Cv}$[ yFrac$_C$ ][ 1 ] * temp[ 1 ] + f$_{Cv}$[ yFrac$_C$ ][ 2 ] * temp[ 2 ] f$_{Cv}$[ yFrac$_C$ ][ 3 ] * temp[ 3 ] ) >> shift2

Note that, if the bit depth of current picture (BitDepth) is smaller than or equal to 12 bits, the shift4 is always equal to 0. For the profile that supporting the bit depth smaller than or equal to 12 bits (e.g. the Main 10, Main 12, Monochrome 12, Main 4:4:4/4:2:2 10/12 profile in HEVC), the modification related to shift4 can be removed.

In another embodiment, the left shift and right shift parameter in the interpolation filtering process need to consider the bit depth of the current picture. For example, when directly fetching the integer pixel without performing the interpolation, the left shift (shift3) can be modified from Max(2, 14−BitDepth) to Max(2, 14−RefBitDepth). Also, for gradient calculation in prediction refinement with optical flow (PROF), the reference samples are directly used. If the bit depth of current picture and reference picture are different, the shift value should be modified. For example, it can be modified from Max(2, 14−BitDepth) to Max(2, 14−RefBitDepth). When doing the interpolation, for the right-shift in the first stage interpolation filter, such as shift1, it can consider the bit depth of the reference picture. The shift1 can be modified from Min(4, BitDepth−8) to Min(4, RefBitDepth−8). The proposed text for the scaling window sizes is as follows and highlighted in Italic.

8.5.6.3.2 Luma Sample Interpolation Filtering Process

Output of this process is a predicted luma sample value predSampleLX$_L$. The variables shift1, shift2 and shift3 are derived as follows:

- Let the RefBitDepth be the BitDepth of the reference picture.
- The variable shift1 is set equal to Min( 4, RefBitDepth − 8 ), the variable shift2 is set equal to 6 and the variable shift3 is set equal to Max( 2, 14 − RefBitDepth ).

*The variable picW is set equal to pic_width_in_luma_samples and the variable picH is set equal to pic_height_in_luma_samples.*

8.5.6.3.3 Luma Integer Sample Fetching Process

Inputs to this process are:

- a luma location in full-sample units (xInt$_L$, yInt$_L$),
- the luma reference sample array refPicLX$_L$, Output of this process is a predicted luma sample value predSampleLX$_L$.

Let the RefBitDepth be the BitDepth of the reference picture.

The variable shift is set equal to Max(2, 14−RefBitDepth).

8.5.6.3.4 Chroma Sample Interpolation Process

Output of this process is a predicted chroma sample value predSampleLX$_C$. The variables shift1, shift2 and shift3 are derived as follows:

- Let the RefBitDepth be the BitDepth of the reference picture. The variable shift1 is set equal to Min( 4, RefBitDepth − 8 ), the variable shift2 is set equal to 6 and the variable shift3 is set equal to Max( 2, 14 − RefBitDepth ).
- The variable picW$_C$ is set equal to pic_width_in_luma_samples / SubWidthC and the variable picH$_C$ is set equal to pic_height_in_luma_samples / SubHeightC.

In the above mentioned method, the bit depth or bit shift in weighted sample prediction process uses the bit depth of the current picture instead of the reference picture.

In another embodiment, all the input reference samples will do the bit depth extension or bit depth reduction to match the bit depth of the current picture. When performing the bit depth reduction, the directly trucation or rounding can be used. When doing the bit depth extension, the n bits of zeros (e.g. 2 bits of '00') can be added after the LSB. In another example, when performing the bit depth extension, the n bits of ones (e.g. 2 bits of '11') can be added after the LSB. In another example, when performing the bit depth extension, the one bit of 1 and n-1 bits of 0 (e.g. 2 bits of '11', 4 bits of '1000') can be added after the LSB. In another example, when performing the bit depth extension, the n bit of signaled or predefined or derived bits can be added after the LSB.

The abovementioned methods can be combined and applied in all or in part.

Any of the foregoing proposed methods can be implemented in encoders and/or decoders. For example, any of the proposed methods can be implemented in a scaling or motion compensation module or parameter determining module of an encoder, and/or a scaling or motion compensation module or parameter determining module of a decoder. Alternatively, any of the proposed methods can be implemented as a circuit coupled to the scaling or motion compensation module or parameter determining module of the encoder and/or the scaling or motion compensation module or parameter determining module of the decoder, so as to provide the information needed by the scaling or motion compensation module or parameter determining module.

Video encoders should follow the foregoing syntax design so as to generate the conforming bitstream, and video decoders are able to decode the bitstream correctly only if the parsing process is complied with the foregoing syntax design. When the syntax elements are skipped in the bitstream, encoders and decoders should set the values of the skipped syntax elements as the inferred values to ensure no mismatch between the encoding and decoding results.

FIG. 1 illustrates an exemplary block diagram of a system incorporating constrained layer-wise video coding according to an embodiment of the present invention, where both the bit depth values and the chroma format index values for the current layer and the reference layer are the same. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, a bitstream is generated at an encoder side or received at a decoder side in step 110, where the bitstream corresponds to coded data of current video data in a current layer. The bitstream complies with a bitstream conformance requirement corresponding to both the bit depth values for the current layer and the reference layer being the same and the chroma format index values for the current layer and the reference layer being the same. The current video data in the current layer is then encoded or decoded by utilizing reference video data in the reference layer in step 120.

Figure 2:
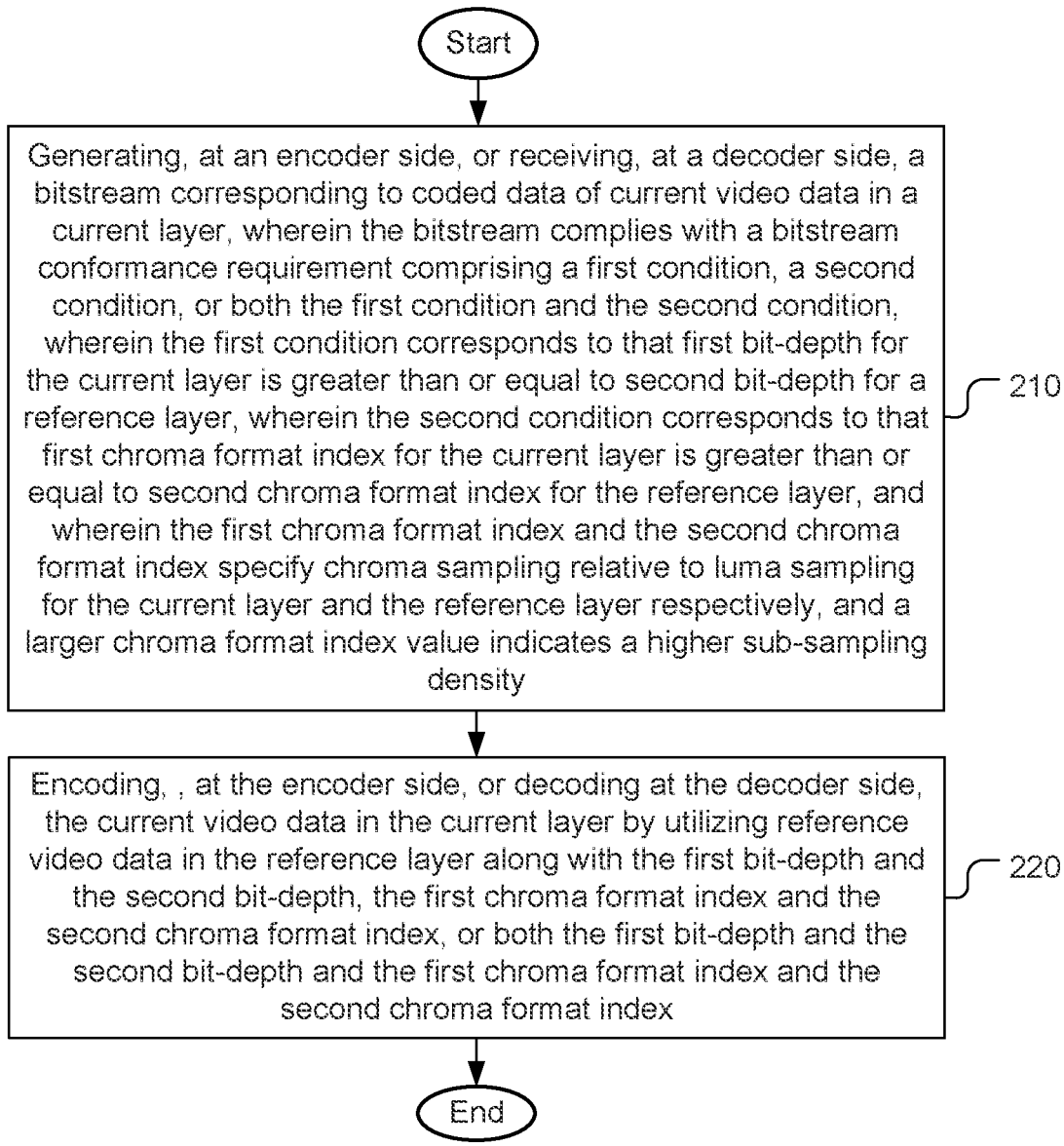
FIG. 2 illustrates an exemplary block diagram of a system incorporating constrained layer-wise video coding according to an embodiment of the present invention, where the bit-depth is for the current layer is greater than or equal to the bit-depth for a reference layer, or the chroma format index for the current layer is greater than or equal to the chroma format index for the reference layer.

FIG. 2 illustrates an exemplary block diagram of a system incorporating constrained layer-wise video coding according to an embodiment of the present invention, where the bit-depth is for the current layer is greater than or equal to the bit-depth for a reference layer, or the chroma format index for the current layer is greater than or equal to the chroma format index for the reference layer. According to this method, a bitstream is generated at an encoder side or received at a decoder side in step 210, where the bitstream corresponds to coded data of current video data in a current layer. The bitstream complies with a bitstream conformance requirement comprising a first condition, a second condition, or both the first condition and the second condition. The first condition corresponds to that first bit-depth for the current layer is greater than or equal to second bit-depth for a reference layer. The second condition corresponds to that first chroma format index for the current layer is greater than or equal to second chroma format index for the reference layer, and the first chroma format index and the second chroma format index specify chroma sampling relative to luma sampling for the current layer and the reference layer respectively. A larger chroma format index value indicates a higher sampling density. In step 220, the current video data in the current layer is then encoded or decoded by utilizing reference video data in the reference layer along with the first bit-depth and the second bit-depth, the first chroma format index and the second chroma format index, or both the first bit-depth and the second bit-depth and the first chroma format index and the second chroma format index.

Figure 3:
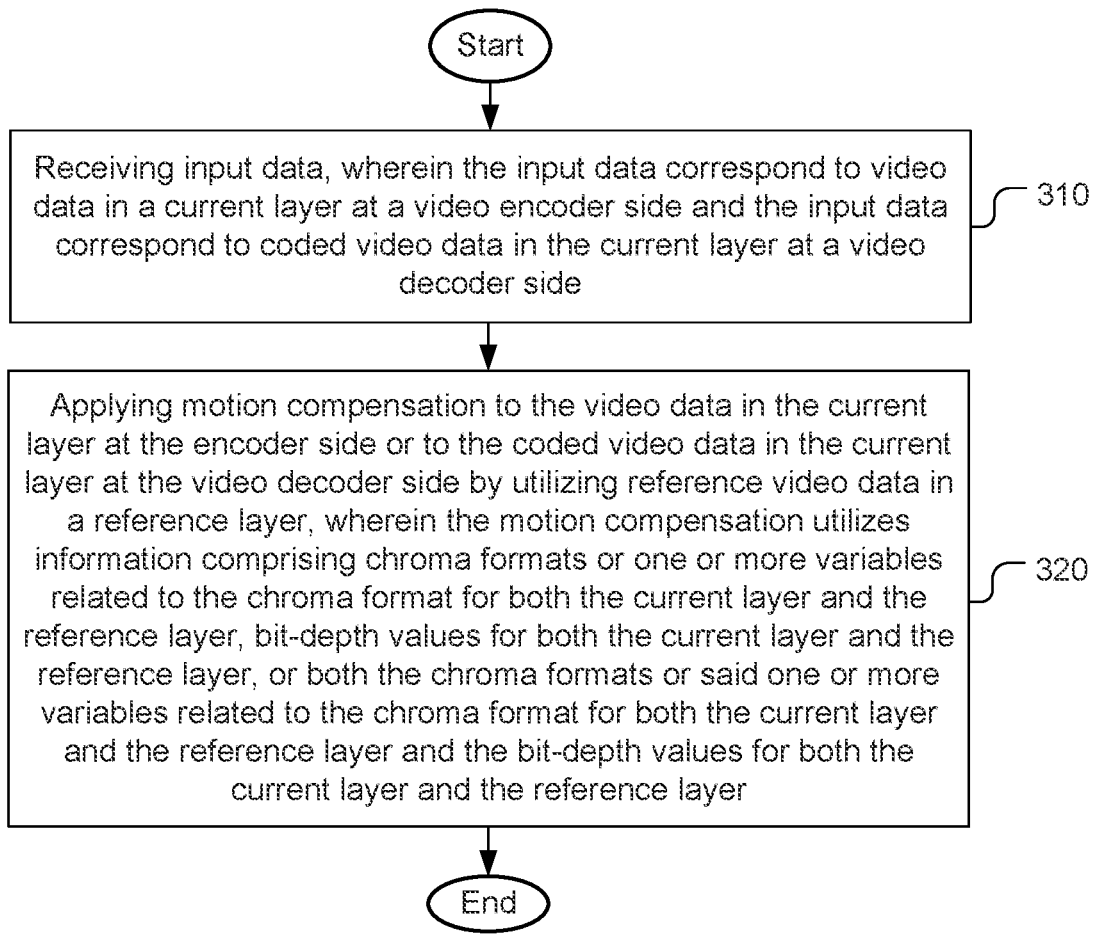
FIG. 3 illustrates an exemplary block diagram of a system incorporating constrained layer-wise video coding according to an embodiment of the present invention, where the motion compensation utilizes information comprising chroma formats or one or more variables related to the chroma format for both the current layer and the reference layer, or bit-depth values for both the current layer and the reference layer.

FIG. 3 illustrates an exemplary block diagram of a system incorporating constrained layer-wise video coding according to an embodiment of the present invention, where the motion compensation utilizes information comprising chroma formats or one or more variables related to the chroma format for both the current layer and the reference layer, or bit-depth values for both the current layer and the reference layer. According to this method, input data are received in step 310, where the input data correspond to video data in a current layer at a video encoder side or the input data correspond to coded video data in the current layer at a video decoder side. Motion compensation is applied to the video data in the current layer at the encoder side or to the coded video data in the current layer at the video decoder side by utilizing reference video data in a reference layer in step 320. The motion compensation utilizes information comprising chroma formats or one or more variables related to the chroma format for both the current layer and the reference layer, bit-depth values for both the current layer and the reference layer, or both the chroma formats or said one or more variables related to the chroma format for both the current layer and the reference layer and the bit-depth values for both the current layer and the reference layer.

The flowcharts shown above are intended for serving as examples to illustrate embodiments of the present invention. A person skilled in the art may practice the present invention by modifying individual steps, splitting or combining steps with departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for video coding, wherein a multi-layer prediction mode is supported, the method comprising:

generating, at an encoder side, or receiving, at a decoder side, a bitstream corresponding to coded data of current video data in a current layer, wherein the bitstream complies with a bitstream conformance requirement corresponding to both bit depth values for the current layer and a reference layer being the same, and chroma format index values for the current layer and the reference layer being the same; and encoding, at the encoder side, or decoding at the decoder side, the current video data in the current layer by utilizing reference video data in the reference layer.

2. The method of claim 1, wherein the bit depth values for the current layer and the reference layer are derived from bit_depth_minus8 syntax elements in the bitstream, and wherein the bit_depth_minus8 syntax elements correspond to the bit depth values minus 8 for the current layer and the reference layer respectively.

3. The method of claim 1, wherein the chroma format index values for the current layer and the reference layer are determined according to chroma_format_idc syntax elements in the bitstream, and wherein the chroma_format_idc syntax elements specify chroma sampling relative to luma sampling for the current layer and the reference layer respectively.

* * * * *